UNITED STATES PATENT OFFICE.

JOSEF CARNIOL, OF VIENNA, AUSTRIA-HUNGARY.

PROCESS OF PURIFYING RAW-SUGAR-CONTAINING JUICE.

1,095,189.    Specification of Letters Patent.    Patented May 5, 1914.

No Drawing.    Application filed May 19, 1913. Serial No. 768,427.

*To all whom it may concern:*

Be it known that I, JOSEF CARNIOL, a subject of the Emperor of Austria-Hungary, and resident of the city of Vienna, Austria-Hungary, have invented certain new and useful Improvements in Processes of Purifying Raw-Sugar-Containing Juice, of which the following is a full, clear, and exact description.

This invention relates to improvements in the purification of the juice of beets, sugar cane, corn or like vegetables from which sugar may be obtained, and the object is to provide means for producing a purer product in less time than heretofore.

A further object is to provide a simplified process of purifying sugar containing juice, which effects an economy in the purifying materials used.

At the present time, the general method of purifying sugar containing juices, particularly beet juice, consists briefly of rendering the juice alkaline by the addition of lime or the like and heating the compound to about 70° Celsius. Natural carbonate of lime, as well as slaked or quick lime, is mixed with the juice, the compound being stirred during mixing. After saturation, the surplus lime and the added carbonate of lime are separated from the juice by filtration.

The process forming the subject of the present invention aims to produce a more complete purification of the juice, and at the same time a saving of lime, by adding powdered lime stone to the diffusion, so that a precipitation of the impurities takes place by the formation of insoluble calcium salts, thus saving precipitation in a later stage and producing a product of higher nutritious value.

When purifying the juice of sugar beets, it is preferred to add the carbonate of lime to the slices of beet on the conveyer or to distribute the carbonate evenly among the slices in the diffusion. The quantity of powdered lime stone to be added depends upon the acidity of the juice, but should not be sufficient to entirely neutralize this acidity, so that the juice remains slightly acid. After this milk of lime of sufficient quantity is added to the juice separated from the pulp, and renders the juice slightly alkaline, about 0.2% to 0.25% being usually ample for this purpose. The juice is now heated to a temperature of about 70° Celsius, and has thoroughly mixed into it powdered lime stone and lime, either in a dry state or as milk of lime or saccharate of lime. The quantity of carbonate of lime must be sufficient to give the slime the desired strength and make easy filtration possible, whereas the quantity of lime is regulated (according to results of titration of the separated unsaturated juice made at regular intervals), so as to give the molasses an alkalinity of about 0.3%.

Where dry separation is introduced or for some reason cold pre-separation is not desirable, the full quantity of lime for a 0.3% alkalinity and also the powdered lime stone can be injected into the juice at the same time. If only an inferior product is required, the quantities of lime stone and lime can be increased to produce an alkalinity in excess of 0.3%.

The separated juice is saturated to the desired degree of alkalinity, and after having been slightly heated if such is necessary, it is passed over one or several discharge openings and then filtered. For a faultless filtration, it is important that discharge openings or separators are provided between malaxators and saturators or between saturating apparatus and the presses, in order to separate the coarser grains of carbonate of lime before the juice is filtered.

The above described process is technically simpler than the usual methods, involves less work at the filter station, and enables an increase in the rate of production combined with a saving in the purifying materials used.

Having thus described my invention, what I claim is:—

A process of purifying raw sugar containing juice, which consists in adding powdered lime stone to the sliced juice containing material, heating the juice obtained to about 70% Celsius, injecting powdered lime stone and sufficient lime to produce an alkalinity of approximately 0.3% in saturation, and removing surplus lime and lime stone by filtration.

In witness whereof, I have hereunto set my hand in the presence of two witnesses.

JOSEF CARNIOL.

Witnesses:
 GRANUEO KARL,
 AUGUST FUGGER.